US011758367B2

(12) United States Patent
Zhao et al.

(10) Patent No.: US 11,758,367 B2
(45) Date of Patent: Sep. 12, 2023

(54) MULTICAST TREE TOPOLOGY HAVING MULTICAST HUBS FOR DIFFERENT MULTICAST AREAS IN A WI-SUN FAN DATA NETWORK

(71) Applicant: Cisco Technology, Inc., San Jose, CA (US)

(72) Inventors: Lei Zhao, Shanghai (CN); Mingyu Xie, Shanghai (CN); Jianfeng Mao, Shanghai (CN); Xiang Fang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 17/315,459

(22) Filed: May 10, 2021

(65) Prior Publication Data

US 2022/0360946 A1    Nov. 10, 2022

(51) Int. Cl.
*H04W 4/06*    (2009.01)
*H04W 40/24*    (2009.01)
*H04L 12/18*    (2006.01)

(52) U.S. Cl.
CPC .......... *H04W 4/06* (2013.01); *H04W 40/248* (2013.01); *H04L 12/189* (2013.01)

(58) Field of Classification Search
CPC ...... H04W 4/06; H04W 40/248; H04L 12/189
See application file for complete search history.

(56) References Cited

U.S. PATENT DOCUMENTS

| 8,259,635 | B2 | 9/2012 | Thubert et al. |
| 9,717,110 | B1* | 7/2017 | Gupta ................. H04W 72/042 |
| 10,218,602 | B2 | 2/2019 | Levy-Abegnoli et al. |
| 10,498,632 | B2 | 12/2019 | Chen et al. |
| 10,548,109 | B2 | 1/2020 | Webb |
| 10,700,984 | B2 | 6/2020 | Savalle et al. |
| 10,855,579 | B2 | 12/2020 | Mishra et al. |
| 10,904,778 | B1 | 1/2021 | Zhang et al. |

(Continued)

OTHER PUBLICATIONS

Zhao et al., U.S. Appl. No. 16/782,958, filed Feb. 5, 2020.

(Continued)

*Primary Examiner* — Kodzovi Acolatse
*Assistant Examiner* — Anindita Sen
(74) *Attorney, Agent, or Firm* — BEHMKE INNOVATION GROUP LLC; James M. Behmke; Jonathon P. Western (57) ABSTRACT

In one embodiment, a method comprises: establishing, by a network management device, a wireless multicast tree topology for a wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and causing, by the network management device, the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas.

20 Claims, 8 Drawing Sheets

(56) References Cited

U.S. PATENT DOCUMENTS

| | | | |
|---|---|---|---|
| 2007/0189290 A1* | 8/2007 | Bauer | H04L 12/4633 370/390 |
| 2012/0076067 A1* | 3/2012 | Yao | H04L 45/16 370/312 |
| 2012/0320790 A1 | 12/2012 | Shaffer et al. | |
| 2013/0188562 A1* | 7/2013 | Espina Perez | H04L 47/28 370/328 |
| 2014/0092769 A1 | 4/2014 | Shaffer et al. | |
| 2014/0204799 A1 | 7/2014 | Pietrowicz et al. | |
| 2014/0222983 A1 | 8/2014 | Dasgupta et al. | |
| 2014/0341227 A1* | 11/2014 | Redi | H04W 40/023 370/410 |
| 2018/0124479 A1 | 5/2018 | Taylor et al. | |
| 2019/0335479 A1 | 10/2019 | Thubert et al. | |
| 2019/0342640 A1 | 11/2019 | Bartier et al. | |
| 2020/0229246 A1 | 7/2020 | Thubert et al. | |
| 2020/0259678 A1 | 8/2020 | Thubert et al. | |
| 2020/0374208 A1 | 11/2020 | Zhang et al. | |
| 2021/0051126 A1 | 2/2021 | Sturek | |

OTHER PUBLICATIONS

Thubert et al., U.S. Appl. No. 16/814,227, filed Mar. 10, 2020.
Harada et al., "IEEE 802.15.4g Based Wi-SUN Communication System", IEICE Trans. Commun., vol. E100-B, No. 7, Jul. 2017, pp. 1032-1043.
Levis et al., "The Trickle Algorithm", Internet Engineering Task Force (IETF), Request for Comments: 6206, Mar. 2011, pp. 1-13.
Heile et al., "Wi-SUN FAN Overview", Ipwan Internet Draft, Jul. 3, 2017, [online], [retrieved on Aug. 20, 2019]. Retrieved from the Internet: URL: <https://tools.ietf.org/pdf/draft-heile-Ipwan-wisun-overview-00.pdf>, pp. 1-15.
Winter, Ed., et al., "RPL: IPv6 Routing Protocol for Low-Power and Lossy Networks", Internet Engineering Task Force (IETF), Request for Comments: 6550, Mar. 2012, pp. 1-157.
Hui, Ed., et al., "Compression Format for IPv6 Datagrams over IEEE 802.15.4-Based Networks", Internet Engineering Fask Force (IETF), Request for Comments: 6282, Sep. 2011, [online], [retrieved on Feb. 18, 2021]. Retrieved from the Internet: URL: <https://tools.ietf.org/pdf/rfc6282.pdf>, pp. 1-24.
Zhang et al., "MPLS Inter-Autonomous System (AS) Traffic Engineering (TE) Requirements", Network Working Group, Request for Comments: 4216, Nov. 2005, [online], [retrieved on Feb. 25, 2021]. Retrieved from the Internet: URL: <https://tools.ietf.org/pdf/rfc4216.pdf>, pp. 1-29.
Wang et al., "Adjusting Network Parameters Dynamically to Accelerate Mesh Network Convergence", Feb. 11, 2019, [online], [retrieved on Mar. 11, 2021]. Retrieved from the Internet: URL: <https://www.tdcommons.org/cgi/viewcontent.cgi?article=3008&context=dpubs_series>, pp. 1-9.
Thubert et al., U.S. Appl. No. 16/789,862, filed Feb. 13, 2020.
Wang, Ed., et al., "6TiSCH Operation Sublayer (6top) Protocol (6P)", Internet Engineering Task Force (IETF), Request for Comments: 8480, Nov. 2018, [online], [retrieved on Apr. 21, 2021]. Retrieved from the Internet: URL: <https://tools.ietf.org/pdf/rfc8480.pdf>, pp. 1-50.
Hui et al., "Multicast Protocol for Low-Power and Lossy Networks (MPL)", Internet Engineering Task Force (IETF), Request for Comments: 7731, Feb. 2016, [online], [retrieved on Apr. 21, 2021], Retrieved from the Internet: URL: <https://tools.ietf.org/pdf/rfc7731.pdf>, pp. 1-29.
Xie et al., "Collision Minimized Firmware Upgrade For LLNS Using Multiple Multicast Domains", Cisco Systems, Inc., Feb. 16, 2018, 9 pages.
Chen et al., "Harmonious Multicast Retransmission for Low-Power and Lossy Networks Firmware Upgrading", Defensive Publications Series, May 10, 2018, [online], [retrieved on Mar. 12, 2021]. Retrieved from the Internet: URL: <https://www.tdcommons.org/cgi/viewcontent.cgi?article=2252&context=dpubs_series>, pp. 1-11.
Thubert et al., U.S. Appl. No. 16/994,829, filed Aug. 17, 2020.
Xie et al., U.S. Appl. No. 17/199,259, filed Mar. 11, 2021.

* cited by examiner

MULTICAST TREE TOPOLOGY HAVING MULTICAST HUBS FOR DIFFERENT MULTICAST AREAS IN A WI-SUN FAN DATA NETWORK

TECHNICAL FIELD

The present disclosure generally relates to a multicast tree topology having multicast hubs for different multicast areas in a WI-SUN field area network (FAN) data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"), and/or Wireless Smart Utilities Network (Wi-SUN) according to the example IETF Internet Draft by Heile et al., "Wi-SUN FAN Overview" (draft-heile-lpwan-wisun-overview-00). Such large-scale wireless mesh networks (also referred to as field area networks (FANs)) can be used for deployment of, for example, a connected grid mesh (CG-mesh) network advanced metering infrastructure (AMI). The CG-mesh network can include hundreds or thousands of IEEE 802.15.4e/g based resource-constrained (e.g., low-power) network devices (also referred to herein as Low Power and Lossy Network (LLN) devices), where each LLN device can reach, within its transmission range, hundreds of neighboring network devices.

The Low-power and Lossy Network (LLN) can include dozens or thousands of low-power network devices: in some cases the LLN can be limited to a wireless mesh network; the LLN devices also can be configured for routing data packets according to a routing protocol designed for such low power and lossy networks, for example "RPL" according to the IETF Request for Comments (RFC) 6550, or 6LoWPAN (according to RFC 6282), etc. The low-power devices, also referred to as "constrained devices" can be constrained by processing power, memory, and energy (e.g., battery power), and therefore may require substantially-long sleep states ("standby" states) in between relatively-short active states for execution of different execution states. Further, noise and/or interference on a wireless RF channel can affect communications between LLN devices, resulting in unreliable data links that can be constrained by high loss rates, low data rates, and instability with relatively low packet delivery rates in the LLN.

A problem in deploying multicasting in a large-scale LLN is that existing proposals for multicasting suffer from high latency, small broadcast slots that can be unsuitable if multiple LLN devices attempt to send a multicast frame, and a limited reliability due to an inability to provide a link layer acknowledgment indicating reception of a multicast packet. Further, multicast transmissions typically utilize a low transmission rate, resulting in longer transmission times that consume channel resources.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: establishing, by a network management device, a wireless multicast tree topology for a wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and causing, by the network management device, the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas.

In another embodiment, an apparatus comprises non-transitory machine readable media configured for storing executable machine readable code, a device interface circuit configured for transmitting a data packet in a wireless mesh network, and a processor circuit. The processor circuit is configured for executing the machine readable code, and when executing the machine readable code operable for: establishing, by the apparatus implemented as a network management device, a wireless multicast tree topology for the wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and causing the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas.

In another embodiment, one or more non-transitory tangible media are encoded with logic for execution by a machine and when executed by the machine operable for: establishing, by the machine implemented as a network management device, a wireless multicast tree topology for a wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and causing, by the network management device, the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas.

DETAILED DESCRIPTION

Particular embodiments provide an intelligent and dynamic network configuration of a wireless multicast tree topology in a wireless data network (e.g., a Wi-SUN FAN) comprising constrained wireless network devices (e.g., Internet of Things (IoT) devices), for optimized distribution of a multicast message using a combination of unicast transmission to wireless multicast hubs, and multicast transmission within different multicast areas by the wireless multicast hubs. One or more of the wireless multicast hubs also can unicast transmit the multicast message (encapsulated within a unicast header) to one or more multicast relay devices for distribution to isolated network devices that are outside transmission range of any of the wireless multicast hubs.

Hence, the example embodiments can minimize collisions on a broadcast channel based on limiting multicast transmission to wireless network devices classified as wireless multicast hubs having non-overlapping wireless multicast areas. The unicast transmission of the encapsulated multicast packet enables each wireless multicast hub to send an acknowledgment in response to receipt of the unicasted encapsulated multicast packet on a transmission channel reserved for unicast transmissions, ensuring reliable reception of the multicast packet to the wireless multicast hub; the unicast transmission also can be executed by a wireless multicast hub for reaching one or more multicast relay devices providing reachability to isolated wireless devices beyond any of the multicast areas.

The example embodiments also enable different multicast group addresses to be allocated for different groups of wireless multicast hubs in the wireless multicast tree topology, enabling a root network device to direct multicast traffic to different multicast areas in the wireless data network.

Figure 1:
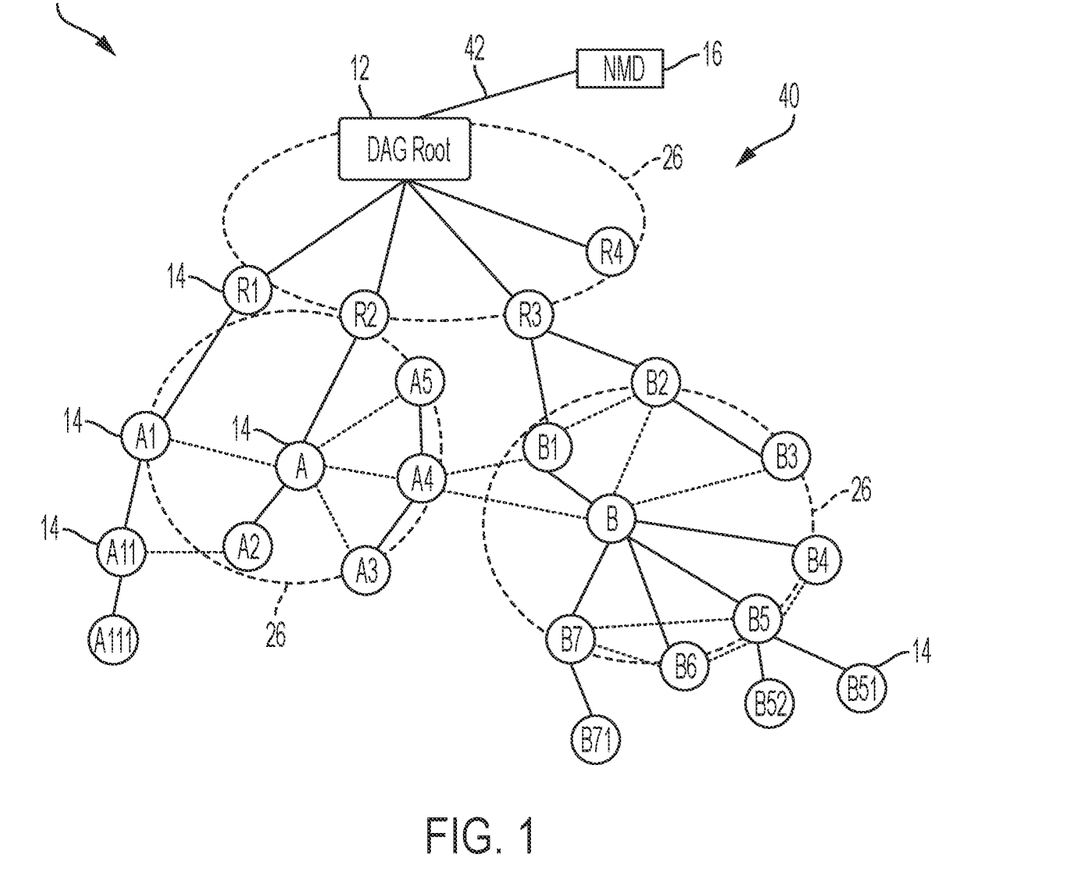
FIG. 1 illustrates an example wireless data network having an apparatus for establishing a wireless multicast tree topology overlying a tree-based topology and comprising wireless multicast hubs for different multicast areas, according to an example embodiment.
Figure 2:
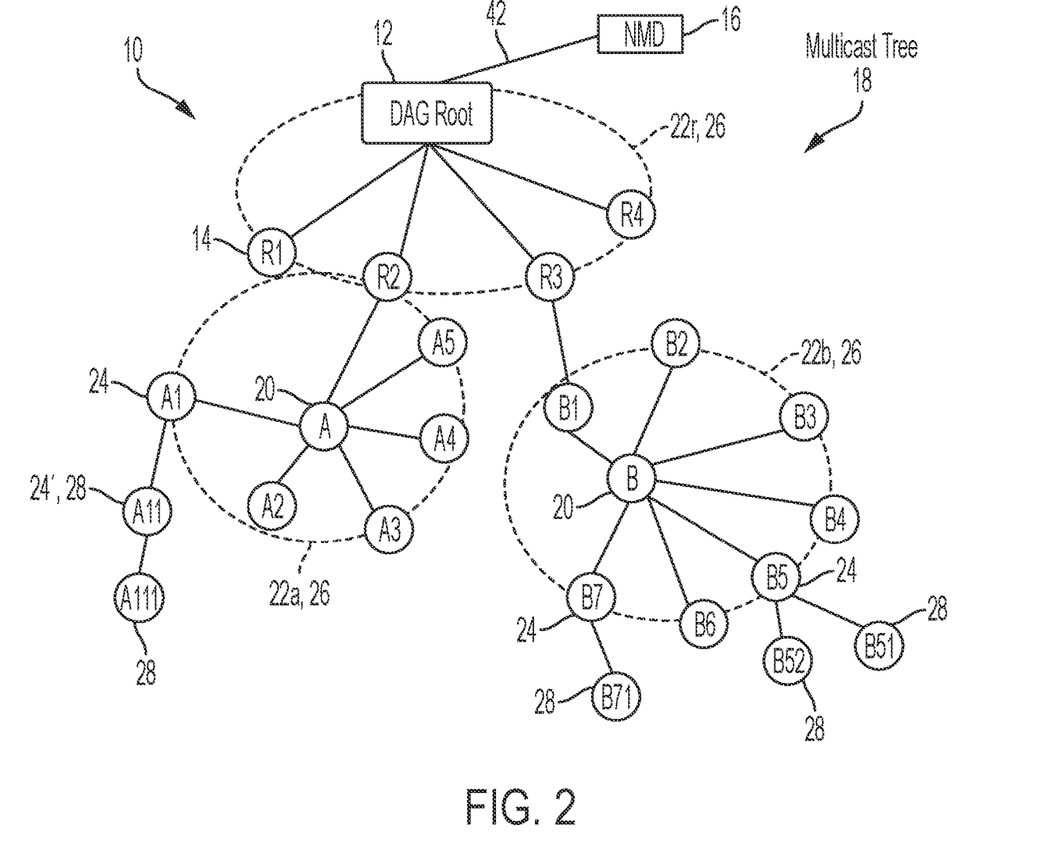
FIG. 2 illustrates an example wireless multicast tree topology established by the apparatus of FIG. 1 and comprising the wireless multicast hubs, isolated wireless devices outside the multicast areas, and multicast relay devices for reaching the isolated wireless devices, according to an example embodiment.
Figure 3:
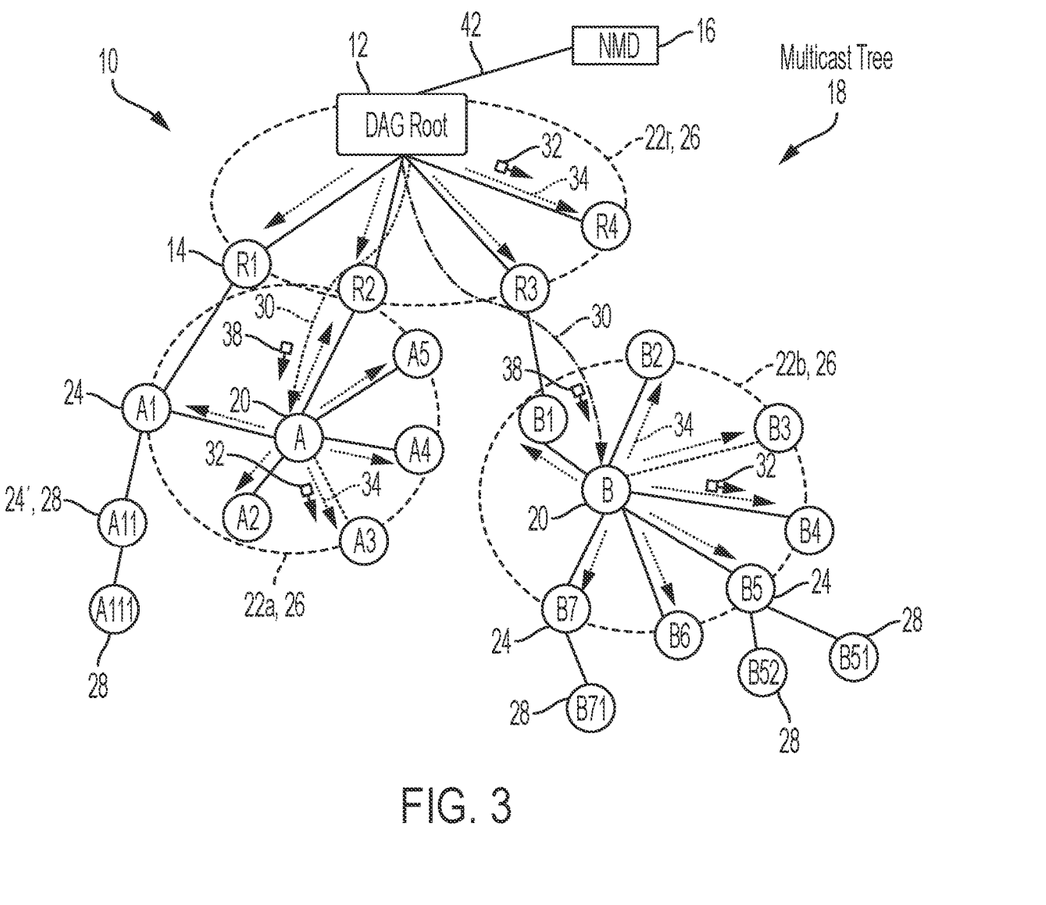
FIG. 3 illustrates the apparatus of FIGS. 1 and 2 causing the root network device to unicast transmit a multicast packet, encapsulated within a unicast header, to the wireless multicast hubs for multicast transmission within the multicast areas, according to an example embodiment.

FIGS. 1-3 illustrate an example a constrained wireless mesh network 10 implemented as a field area network (FAN), for example an IEEE 802.15.4e/g based CG-mesh network having a root network device 12, wireless network devices (WNDs) 14 implemented for example as constrained LLN devices, and a network management device (NMD) (e.g., a Wi-SUN Field Network Director (FND)) 16, according to an example embodiment. The root network device 12 can be configured for operating as a directed acyclic graph (DAG) root for multiple wireless network devices 14. The wireless mesh data network 10 can be implemented as a Wi-SUN based field area network (FAN) having a star topology or cluster topology.

The root network device "DAG ROOT" 12 can be implemented, for example, as a commercially-available Cisco® 1000 Series Connected Grid Router (CGR) from Cisco Systems, San Jose, Calif., that is modified as described herein; hence, the root network device 12 also can be referred to herein as a CGR 12 or root network device 12.

The management device (e.g., FND) 16 can be configured for deploying and managing the link-layer wireless data network 10, illustrated as a Wi-SUN FAN. As illustrated in FIGS. 2 and 3 and described in further detail below, the management device (e.g., FND) 16 also can be configured for dynamically establishing a wireless multicast tree topology 18 that comprises the root network device 12, selected wireless network devices 14 classified as wireless multicast hubs 20 providing respective wireless multicast areas 22, and one or more wireless network devices 14 classified as multicast relay devices 24 configured for reaching one or more wireless network devices 14 classified as isolated wireless devices 28 that are outside the wireless transmission range (26 of FIG. 1) of the root network device 12 or any of the wireless multicast hubs 20.

Figure 6:
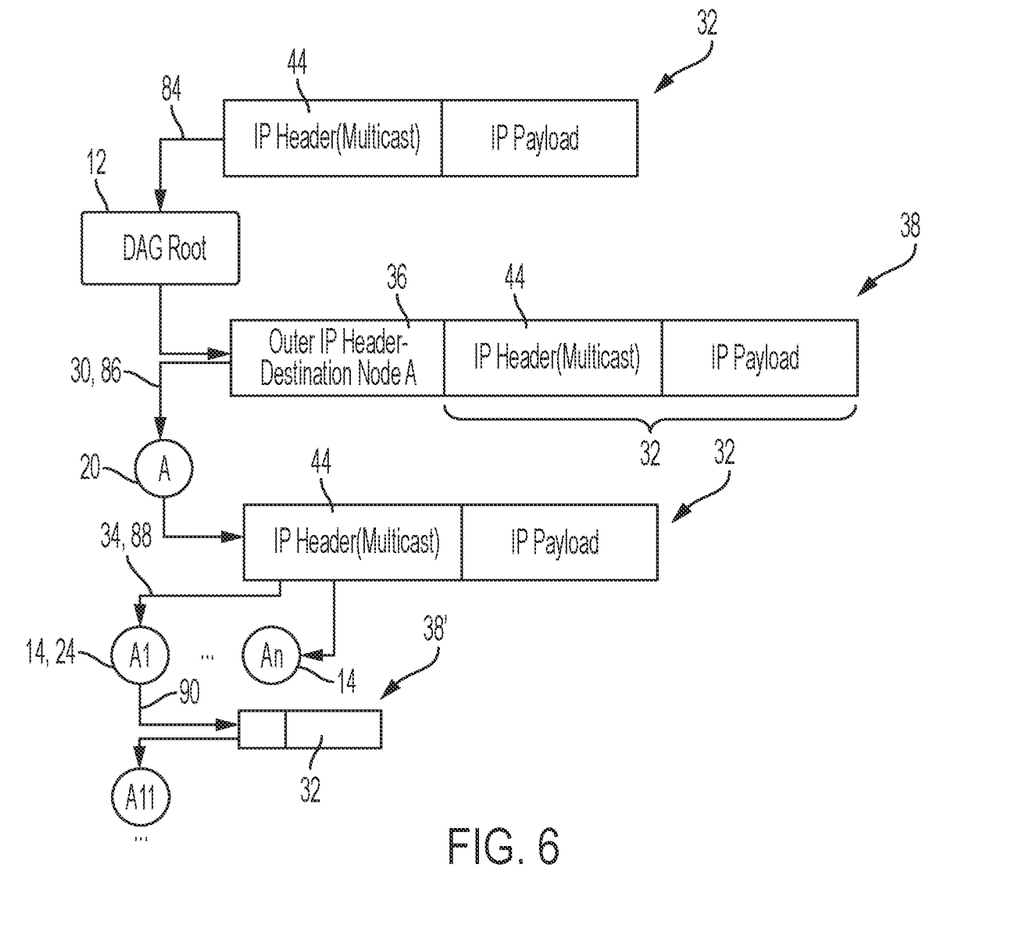
FIG. 6 illustrates an example encapsulation of a multicast packet with a unicast header for unicast transmission to a wireless multicast hub, and multicast transmission of the multicast packet by the multicast hub within its multicast area, according to an example embodiment.

Hence, the network management device 16 can cause the root network device 12 to execute a unicast transmission 30 of a multicast packet 32 encapsulated within a unicast header as an encapsulated packet (38 of FIG. 6): as described below, the unicast transmission 30 of the encapsulated packet 38 containing the multicast packet 32 can cause the multicast packet 32 to be selectively multicast 34 by any one or more of the root network device 12, one or more of the wireless multicast hubs 20, and/or one or more of the multicast relay devices 24, described below. Hence, as illustrated in FIG. 6, the root network device 12 can respond to reception of the multicast packet 32 by encapsulating the multicast packet 32 with a unicast header 36 specifying the its destination address field a corresponding IPv6 address of a wireless multicast hub (e.g., "A") 20, and unicast transmitting 30 the resulting encapsulated packet 38 to the destination wireless multicast hub (e.g., "A") 20 via a DODAG topology (40 of FIG. 1) having been previously established by the root network device 12; the destination wireless multicast hub (e.g., "A") 20 can respond to the receipt of the encapsulated packet 38 by sending an acknowledgment to the root network device 12 (via the DODAG topology 40), removing the unicast header 36 (based on detecting its IPv6 address in the destination address field of the unicast header 36), and multicast transmitting 34 the multicast packet 32 to neighboring network devices 14 within its transmission range 26. As described in further detail below, the network management device 16 can instruct any one or more of the root network device 12, the wireless multicast hubs 20 and/or the multicast relay devices 24 to execute additional unicast operations based on specific multicast group addresses allocated specified in the multicast packet 32.

Hence, the root network device 12 can establish a wireless multicast tree topology 18 that optimizes multicast transmissions 34 of a multicast packet 32, based on selective unicast transmission 30 of an encapsulated packet 38 (containing the multicast packet 32) that is directed to selected wireless multicast hubs 20 for interference-free multicast transmission 34 within non-interfering wireless multicast areas 22; the root network device 12 also can cause one or more multicast relay devices 24 to multicast transmit the multicast packet 32 and/or unicast transmit the multicast packet 32 within another encapsulated packet for delivery to an isolated wireless device 28. As described below, the classification of different device types in the wireless multicast tree topology 18 also can be used for prioritizing multicast transmissions between different wireless network devices 14 within the same interference domain, for example based on adjusting a multicast retry window size based on multicast device type and multicast queue size.

Each wireless network device 14 in the wireless mesh data network 10 can establish a link layer mesh topology via wireless data links according to IEEE 802.15.4e/g based Wi-SUN protocols. Each wireless network device 14 can be implemented as a constrained network device, or "LLN device" or "CG-mesh" device, configured for operating for example as a RPL node according to the Internet Engineering Task Force (IETF) Request for Comments (RFC) 6550.

A description will first be provided of the network layer topology illustrated as a DODAG topology 40 (Destination Oriented Directed Acyclic Graph) according to the Internet Engineering Task Force (IETF) Request for Comments (RFC) 6550, followed by a description of the generation of the wireless multicast tree topology 18 by the management device (e.g., FND) 16 for optimized multicast transmissions 34 of the multicast packet 32.

The root network device 12 can provide a link layer connection (e.g., via a wireless data link, a high-speed wired backbone link, etc.) and/or a network layer connection overlying the link layer connection for reaching the network management device 16. Hence, each wireless network device 14 can be configured for address autoconfiguration, for example based on exchanging messages (via the root network device 12) with a DHCP server device (not shown), or based on IPv6 Neighbor Discovery (IPv6 ND). Hence, each wireless network device 14 can join the DODAG topology 40 overlying the wireless mesh data network 10, described below, that is rooted at the root network device 12. Each wireless network device 14 also can send and receive messages associated with various network management-based services provided by the network management device 16 via the root network device 12; each wireless network device 14 also can send and receive messages associated with various application services provided via the root network device 12.

The root network device 12 can be configured for causing creation of the DODAG topology 40 overlying the link layer mesh data network 10 based on transmitting one or more DODAG information object (DIO) messages (not shown), for example according to RFC 6550. Each wireless network device 14 in the wireless mesh data network 10 can join the DODAG topology 40 via wireless data links in response to receiving the multicast DIO message. The wireless mesh data network 10 can be implemented as a Low-power and Lossy Network (LLN) that can include dozens or thousands of low-power wireless network devices 14 each configured for routing data packets according to a routing protocol designed for such low power and lossy networks, for example RPL: such wireless network devices 14 can be referred to as "RPL nodes" or constrained LLN devices, each constrained LLN device in the wireless mesh data network 10 can be constrained by processing power, memory, and energy (e.g., battery power); interconnecting wireless data links between the wireless network device 14 can be constrained by high loss rates, low data rates, and instability with relatively low packet delivery rates.

The DODAG topology 40 can be established based on creating routes toward a single "root" network device 12 in the form of a directed acyclic graph (DAG) toward the root network device 12, where all routes in the wireless mesh data network 10 terminate at the root network device 12 (also referred to as a "DAG destination"). Network traffic can move either "up" towards the root network device 12 or "down" towards the DODAG leaf nodes (e.g., nodes "A111", "A3", "B71", "B6", "B51", etc.).

The DODAG topology 40 can be formed based on the DIO message advertised by the root network device 12, where a "child" network device (e.g., "R1") 14 detecting the DIO can select the root network device 12 as a parent in the identified DODAG topology 40 based on comparing network topology metrics (advertised in the DIO) to a prescribed objective function of the RPL instance. The "child" network device (e.g., "R1") 14, upon attaching to its parent, can output its own DIO with updated network topology metrics that enable other wireless constrained LLN devices 14 to discover the DODAG topology 40, learn the updated network topology metrics, and select a DODAG parent. Hence, the constrained LLN devices 14 in the LLN 10 can join the DODAG topology 40 in response to receiving a multicast DIO message from an advertising DODAG parent device, and selecting the DODAG parent as a default route. Dashed lines in FIG. 1 indicate wireless RF neighbors, and solid lines in FIG. 1 indicate RPL DODAG neighbors having a parent-child relationship in the DODAG topology 40.

A single instance of the DODAG topology 40 also is referred to as a Personal Area Network (PAN) or a Field Area Network (FAN) in the case of Wi-SUN based deployments. Hence, a wireless mesh data network 10 can include a plurality of PANs (not shown), where each PAN includes one root network device 12 (exclusively allocated to the PAN) and multiple wireless network devices (e.g., LLN devices) 14 connected exclusively within the PAN according to the DIO messages originated by the corresponding one root network device 12. Hence, unless explicitly stated otherwise herein, a wireless network device 14 is configured to belong to only one PAN at a time, i.e., a wireless network device 14 is configured to be attached only within one DODAG, although the wireless network device 14 can be configured for attachment to one or more parent network devices 14 within a single DODAG.

The root network device 12 can specify within the DIO message a Mode of Operation (MOP) field value that identifies the mode of operation for the RPL instance: according to RFC 6550, the MOP field is administratively provisioned at and distributed by the DODAG root, where all nodes who join the DODAG must be able to honor the MOP in order to fully participate as a router (else they must only join as a leaf). Hence, a MOP field value of "0" identifies no downward routes are maintained by the root network device 12 or any wireless network device 14 (i.e., the DODAG operates in a collection-only mode); a MOP field value of "1" identifies the DODAG operates in a non-storing mode (where only the root network device 12 maintains downward routes and source routes each data packet to a destination wireless network device 14); and a MOP field value of "2" identifies the DODAG operates in a storing mode, where each wireless network device 14 stores a next-hop route for reaching an attached child network device. A MOP field value of "3" identifies the DODAG operates in a storing mode with multicast support.

Hence, downward routes (i.e., away from the DAG root) can be created in any one of the three available types of downward-routing mode in response to a wireless network device 14 receiving a DIO message specifying a MOP field value of "1", "2", or "3" for the RPL instance, however no downward routes can be created in the collection-only mode if the DIO message specifies a MOP field value of "0" (i.e., "MOP=0"). If downward routes are permitted as specified by the MOP field value "1", "2", or "3" in the DIO message, a DIO message can respond by generating and transmitting a Destination Advertisement Object (DAO) message: in nonstoring mode the DAO is unicast transmitted by the wireless network device 14 to the root network device 12, whereas in storing mode the DAO message is unicast transmitted by the wireless network device 14 to each of its parents. Hence, in storing mode a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

The root network device 12, in response to receiving the DAO messages from the RPL nodes 14 based on the DIO message specifying nonstoring mode, can build the entire DAG topology and store the DAG topology in its memory circuit 54 (illustrated in FIG. 4), including storage of heuristics of usage, path length, knowledge of device capacity, link reliability, etc.

Although the wireless mesh data network 10 is illustrated as having a DODAG topology 40 having a root network device 12 and multiple-hop paths for reaching leaf network devices (e.g., nodes "A111", "A3", "B71", etc.), the wireless mesh data network 10 also can be implemented as a Wi-SUN based network having a star topology or cluster topology and utilizing 6LoWPAN.

Although only the network devices "R1", "A", "A1", "A11" and "B51" are labeled with the reference numeral "14" in FIG. 1 to avoid cluttering in the Figures, it should be apparent that all the network devices "R1" through "R4", "A" through "A111", and "B" through "B71" are allocated the reference numeral "14" for purposes of the description herein.

Figure 4:
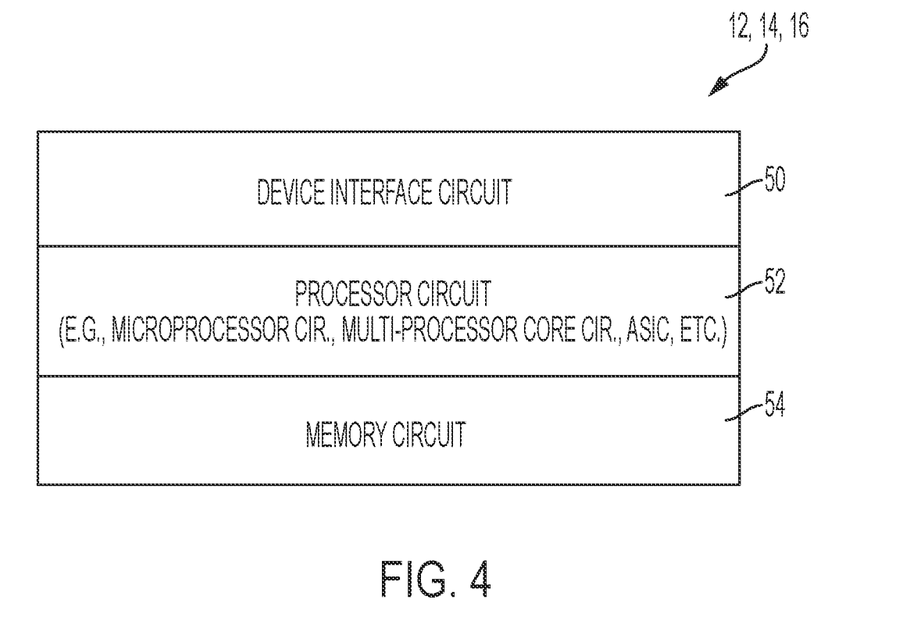
FIG. 4 illustrates an example implementation of any one of the network devices of FIGS. 1A-1C, according to an example embodiment.

FIG. 4 illustrates an example implementation of any one of the devices 12, 14, and/or 16 of FIGS. 1-3, according to an example embodiment. Each apparatus 12, 14, and/or 16 is a physical machine (i.e., a hardware device) configured for implementing network communications with other physical machines 12, 14, and/or 16 via the network 10. The term "configured for" or "configured to" as used herein with respect to a specified operation refers to a device and/or machine that is physically constructed and arranged to perform the specified operation.

Each apparatus 12, 14, and/or 16 can include a device interface circuit 50, a processor circuit 52, and a memory circuit 54. The device interface circuit 50 can include one or more distinct physical layer transceivers for communication with any one of the other devices 12, 14, and/or 16; the device interface circuit 50 also can include an IEEE based Ethernet transceiver for communications with the devices of FIGS. 1A-1C via any type of data link (e.g., a wired or wireless link, an optical link, etc.). The processor circuit 52 can be configured for executing any of the operations described herein, and the memory circuit 54 can be configured for storing any data or data packets as described herein.

Any of the disclosed circuits of the devices 12, 14, and/or 16 (including the device interface circuit 50, the processor circuit 52, the memory circuit 54, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 54) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 54 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 54 can be implemented dynamically by the processor circuit 52, for example based on memory address assignment and partitioning executed by the processor circuit 52.

FIGS. 5A through 5D illustrate an example method of causing a root network device to unicast transmit, to wireless multicast hubs within a wireless multicast tree topology, an encapsulated multicast packet for selective multicast transmission within different multicast areas, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 5A:
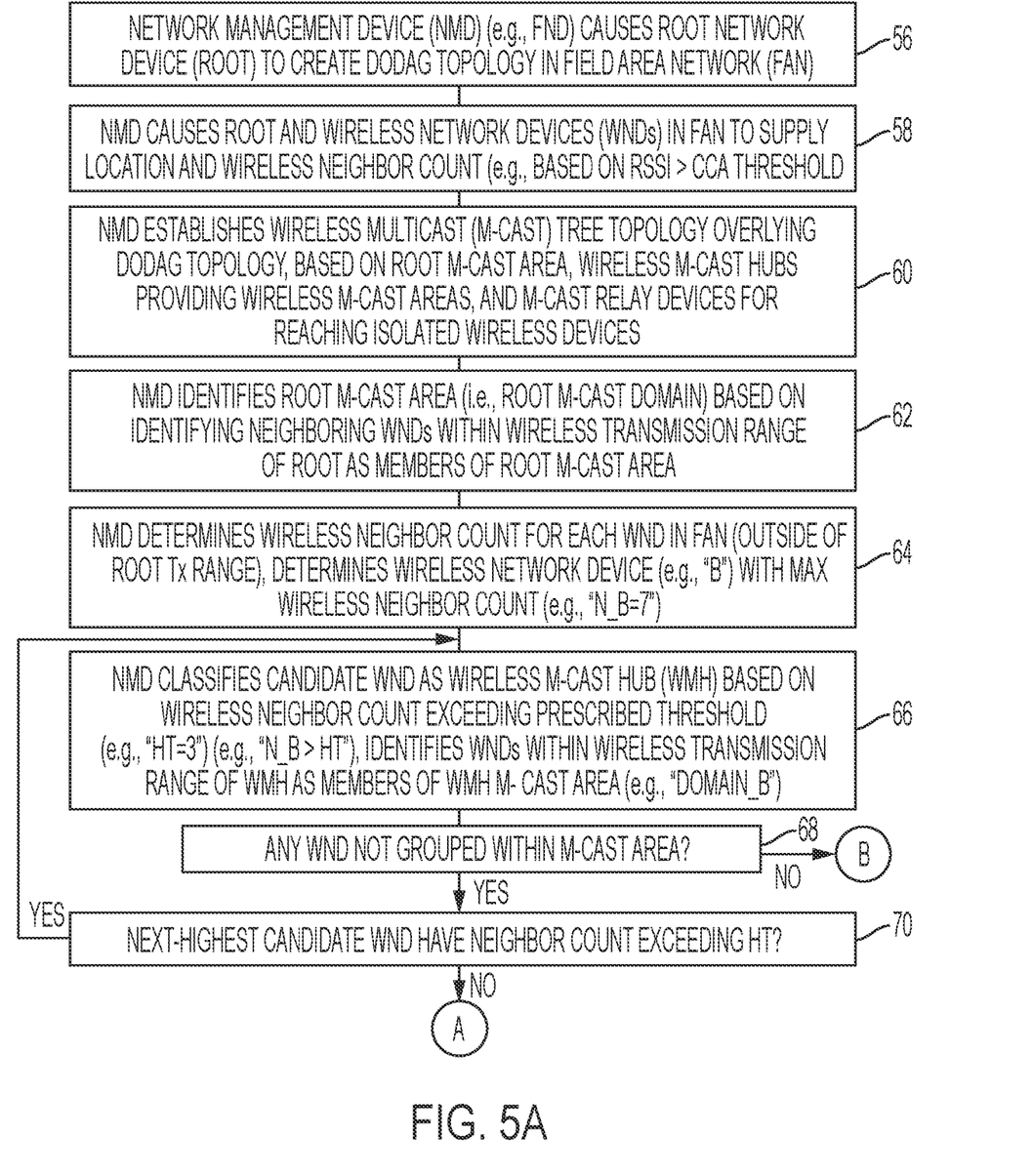
FIGS. 5A through 5D illustrate an example method of causing a root network device to unicast transmit, to wireless multicast hubs within a wireless multicast tree topology, an encapsulated multicast packet for selective multicast transmission within different multicast areas, according to an example embodiment.

Referring to FIG. 5A, the processor circuit 52 of the network management device 16 in operation 56 can cause the root network device 12 to create the DODAG topology 40 in the wireless mesh data network 10, as described previously based on causing the root network device 12 to output DIO messages for formation of the DODAG topology 40. For example, each wireless network device 14 upon initialization (e.g., initial field deployment upon initial turn-on) can participate in establishing a link-layer mesh in the wireless mesh data network 10, for example based on initiating link layer discovery using initial default link layer parameters that are "soft-programmed" into its memory circuit 54. Hence, each wireless network device 14 on initialization can establish an initial (non-optimized) link layer mesh that is rooted by the root network device 12.

The processor circuit 52 of the network management device 16 in operation 56 can send an instruction to the root network device 12 requesting that the root network device 12 and each wireless network device 14 report any neighboring network devices. Hence, the processor circuit 52 of the network management device 16 in operation 58 can cause the root network device 12 and each of the wireless network devices 14 to supply, to the network management device 16, location information and a wireless neighbor count.

A root network device 12 and any wireless network device 14 can identify a wireless neighbor based on detecting a received signal strength indicator (RSSI) exceeding a prescribed Clear Channel Assessment (CCA) threshold that is used for triggering link-layer collision avoidance operations (CSMA/CA) according to IEEE 802.15.4e/g. For example, the root network device 12 can detect its neighbors "R1", "R2", "R3" and "R4" that are within the transmission range 26 of the root network device 12, based on detecting that the RSSI from each of the identified neighbors "R1", "R2", "R3" and "R4" exceeds the prescribed CCA threshold; the wireless network device "A" 14 can detect neighboring wireless network devices "R2", "A1", "A2", "A3", "A4", and "A5" that are within the transmission range 26 of the wireless network device "A" 14, based on detecting that the RSSI from each of the identified neighbors "R2", "A1", "A2", "A3", "A4", and "A5" exceeds the prescribed CCA threshold; and the wireless network device "B" 14 can detect its neighbors "B1", "B2", "B3", "B4", "B5", "B6", and "B7" 14 that are within the transmission range 26 of the wireless network device "B" 14, based on detecting that the RSSI from each of the identified neighbors "B1", "B2", "B3", "B4", "B5", "B6", and "B7" exceeds the prescribed CCA threshold.

Hence, each wireless network device 14 can determine its corresponding set of one-hop neighbors (i.e., "one-hop close neighbor count") within its corresponding transmission range 26, along with the corresponding link layer strength (e.g., RSSI value) for each of its one-hop neighbors. Hence, each wireless network device 14 in operation 58 can store in its memory circuit 54 a plurality of neighbor entries, each neighbor entry identifying a corresponding neighbor and its corresponding link layer strength value.

Each wireless network device 14 in operation 58 also determine and can store in its memory circuit 54 one or more physical location identifiers that identify the physical location of the wireless network device 14 in the Wi-SUN FAN 10, for example based on GPS coordinates, or sharing location-based data as described for example in U.S. Pat. No. 10,548,109.

Each wireless network device 14 in operation 58 can register itself with the network management device 16 for initial deployment of the wireless mesh data network 10, for example before or after establishment of the initial link layer mesh network by the wireless network devices 14 and establishment of a network-based topology such as a DODAG topology 40. For example, each wireless network device 14 can send a CoAP message specifying its corresponding location and list of neighboring network devices 14. Each wireless network device 14 also can access a DHCP server and/or AAA-based authentication server (not shown) in the management device (e.g., FND) 16, as needed. Each wireless network device 14 also can generate and output to the root network device 12 a DAO message that specifies its corresponding location and its neighbor list, for example in response to attaching to a parent network device in the DODAG topology 40 according to RFC 6550.

The processor circuit 52 of the network management device 16 in operation 60 can register each wireless network device 14 (e.g., based on creating a device entry in its memory circuit 54) in response to the device interface circuit 50 of the network management device 16 receiving a registration from a corresponding wireless network device 14. As described previously, each registration request output by a wireless network device 14 can specify a corresponding one-hop close neighbor count, a neighbor identifier (and corresponding link layer strength) for each one-hop close neighbor, and a corresponding physical location identifier that identifies the physical location of the registering wireless network device 14; hence, the processor circuit 52 of the network management device 16 in operation 60 can register each wireless network device 14 by its network identifier (e.g., IPv6 address), one-hop close neighbor count, list of one-hop close neighbors and respective link layer strength values, and physical location identifier.

The processor circuit 52 of the management device (e.g., FND) 16 in operation 60 can establish the wireless multicast tree topology 18, overlying the DODAG topology 40, based on the corresponding location information, corresponding wireless neighbor count (i.e., one-hop close neighbor count), and the list of one-hop close neighbors supplied by each wireless network device 14. As described in further detail below, the processor circuit 52 of the network management device 16 can establish the wireless multicast tree topology 18 based on the root network device 12 establishing a root multicast area 22r within its transmission range 26, and further based on classifying selected wireless network devices (e.g., "A" and "B") 14 as wireless multicast hubs 20 having respective multicast areas 22 (e.g., 22*a* and 22*b*); the processor circuit 52 of the network management device 16 also can establish the wireless multicast tree topology 18 based on the network management device 16 classifying one or more wireless network devices (e.g., "A1", "A11", "B5", "B7") 14 as multicast relay devices 24 for reaching isolated wireless devices (e.g., "A111", "B51", "B52", "B71") 28.

For example, the processor circuit 52 of the network management device 16 in operation 62 can identify the root multicast area 22*r* (i.e., the root multicast domain) based on identifying the neighboring wireless network devices "R1", "R2", "R3" and "R4" that are within the transmission range 26 of the root network device 12 as members of the root multicast area 22*r*.

The processor circuit 52 of the network management device 16 in operation 64 can determine the wireless neighbor count for each wireless network device 14 in the wireless mesh data network 10 (outside of the root multicast area 22*r*) in order to determine the wireless network device (e.g., "B") 14 having the maximum wireless neighbor count: as illustrated in FIGS. 1-3, the wireless network device "B" 14 has the maximum wireless neighbor count of "N_B=7". Hence, the processor circuit 52 of the network management device 16 in operation 66 can classify the candidate wireless network device "B" 14 as a wireless multicast hub 20 based on determining its corresponding wireless neighbor count (e.g., "N_B=7") exceeds a prescribed neighbor threshold (e.g., "HT=3"), for example "N_B>HT". The processor circuit 52 of the network management device 16 in operation 66 also can identify the wireless network devices "B1", "B2", "B3", "B4", "B5", "B6", and "B7" 14 that are within the wireless multicast area 22*b* of the wireless multicast hub "B" 20.

The processor circuit 52 of the network management device 16 in operation 68 can continue establishing the wireless multicast tree topology 18 if not all of the wireless network devices 14 have been identified as within a wireless multicast area 22; hence, the processor circuit 52 of the network management device 16 can determine in operation 70 if the next-highest candidate wireless network device (e.g., "A") 14 has a neighbor count (e.g., N_A=6") exceeding the threshold, and in response the processor circuit 52 of the network management device 16 can classify the next candidate wireless network device (e.g., "A") 14 as a wireless multicast hub 20 in operation 66, including identifying the neighboring wireless network devices "R2", "A1", "A2", "A3", "A4", and "A5" that are within the wireless multicast area 22*a* of the wireless multicast hub "A" 20.

Following the classification of the wireless network device "A" 14 as a wireless multicast hub 20, the processor circuit 52 of the network management device 16 in operation 70 can determine that there are no more wireless network devices 14 that can qualify as a wireless multicast hub 20 (i.e., having a neighbor count exceeding the prescribed hub threshold "HT").

Figure 5B:
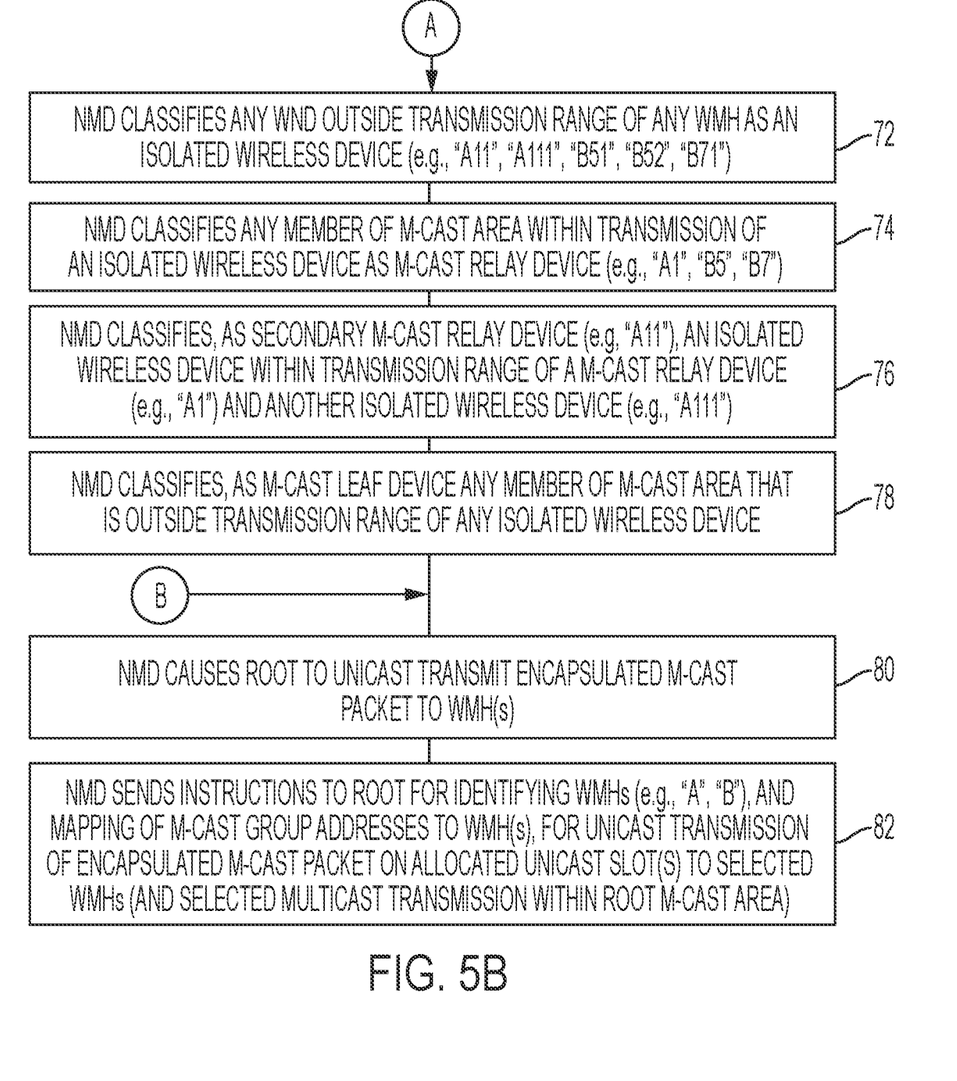

Referring to FIG. 5B, the processor circuit 52 of the network management device 16 in operation 72 can continue establishing the wireless multicast tree topology 18 based on classifying any wireless network device 14 outside the transmission range 26 of the root network device 12 or any wireless multicast hub "A" or "B" 20 (i.e., outside any of the wireless multicast areas 22*r*, 22*a*, or 22*b*) as an isolated wireless device 28; hence, the processor circuit 52 of the network management device 16 in operation 72 can identify the wireless network devices "A11", "A111", "B51", "B52", and "B71" as isolated wireless devices 28 (and thus requiring a multicast relay for reception of a multicast packet 32).

The processor circuit 52 of the network management device 16 in operation 74 can classify, as a multicast relay device 24, any member of a root multicast area 22*r*, 22*a*, or 22*b* that is within transmission range of an isolated wireless device 28; hence, the processor circuit 52 of the network management device 16 in operation 74 can classify the wireless network devices "A1" (which neighbors "A11"), "B5" (which neighbors "B51" and "B52"), and "B7" (which neighbors "B71") as multicast relay devices 24.

The processor circuit 52 of the network management device 16 in operation 76 also can classify the wireless network device "A11" as a secondary multicast relay device 24', based on the processor circuit 52 of the network management device 16 determining in operation 76 that the wireless network device "A11" is an isolated wireless device 28 that is within transmission range of a multicast relay device (e.g., "A1") 24 and also within transmission range of another isolated wireless device (e.g., "A111"). Hence, the secondary multicast relay device "A11" 24' can provide a multicast packet 32 to the isolated wireless device "A111" based on reception thereof from the multicast relay device "A1" 24.

The processor circuit 52 of the network management device 16 in operation 78 can further establish the wireless multicast tree topology 18 based on classifying, as a multicast leaf device, any member device of a wireless multicast area 22 that is outside the transmission range of any isolated wireless device 28; the network management device 16 also can identify as a leaf device any isolated wireless device 28 that has only a multicast relay device 24 within its transmission range. Hence, the processor circuit 52 of the network management device 16 in operation 76 can identify as multicast leaf devices the wireless network devices "R1", "R2", "R3", "R4", "A2", "A3", "A4", "A5", "A111", "B1", "B2", "B3", "B4", "B51", "B52", "B6", and "B71".

Hence, the processor circuit 52 of the network management device 16 can establish the wireless multicast tree topology 18 based on establishing the root multicast area 22*r*, classifying the wireless multicast hub "A" 20 providing the wireless multicast area 22*a* and the wireless multicast hub "B" 20 providing the wireless multicast area 22*b*, classifying the multicast relay devices 24, and classifying the leaf network devices within the wireless multicast tree topology 18.

The processor circuit 52 of the network management device 16 in operation 80 can cause the root network device 12 to unicast transmit (30 of FIG. 3), to a selected one or more of the wireless multicast hubs "A" and/or "B" 20, a multicast packet 32 that is encapsulated within a unicast header 36, enabling the root network device 12 to unicast transmit an encapsulated packet 38 to each of the wireless multicast hubs "A" and/or "B" 20. In particular, the processor circuit 52 of the network management device 16 in operation 82 can generate and send, to the root network device 12, instructions (described in further detail below) that provide an identification of the wireless multicast hubs "A" and "B" 20 by respective IPv6 addresses, enabling the root network device 12 to unicast route an encapsulated packet 38 to each wireless multicast hub "A" 20 and wireless multicast hub "B" 20 via the DODAG topology 40. The instructions also can specify a mapping of multicast group addresses to multicast hub destinations, illustrated in Table 1:

TABLE 1

MULTICAST GROUP ADDRESS MAPPING

| MULTICAST GROUP IPv6 ADDRESS | DESTINATION |
|---|---|
| AA00::0 | Root Multicast, Unicast to A and B for Multicasting by A and B (Global Multicast) |
| 0A00::0 | Unicast to A only for Multicasting by A |
| 0B00::0 | Unicast to B only for Multicasting by B |
| 0B50::0 | Unicast to B5 only (B5 Can Multicast or Unicast Depending on Number of Neighbors) |
| AB00::0 | Unicast to A and B for Multicasting |
| FF::00 | Root Multicast Only |

Hence, the instructions sent by the network management device 16 in operation 82 enable the root network device 12 to selectively multicast and/or unicast transmit a received multicast packet 32 based on the multicast IPv6 address specified in the multicast packet 32.

Figure 5C:
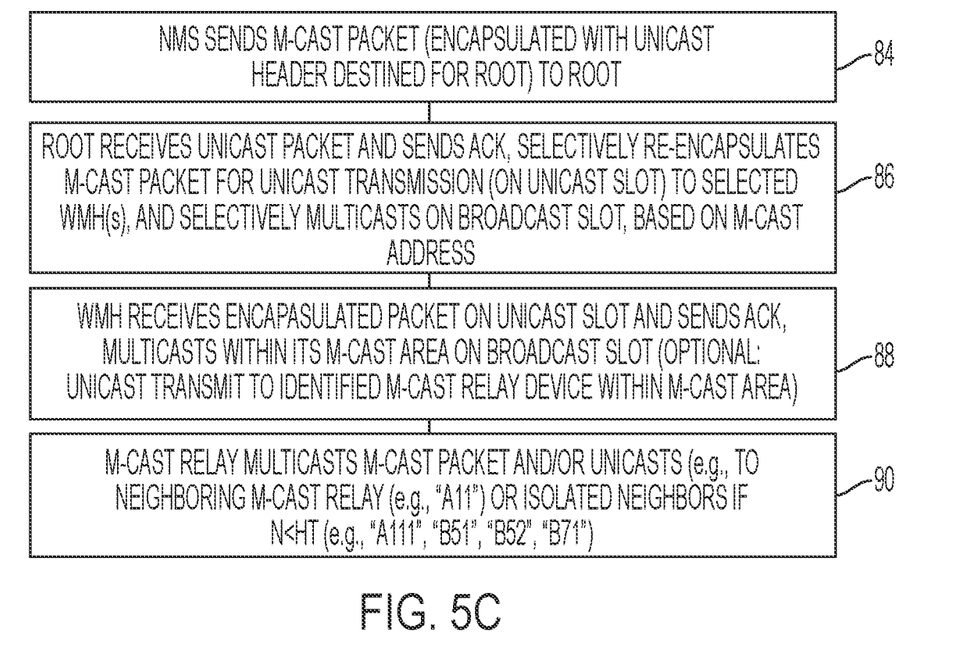

Referring to FIG. 5C, the processor circuit 52 of the network management device 16 in operation 84 can generate and send a multicast packet 32 to the root network device 12 via a wired or wireless connection 42. In one example, the multicast packet 32 can be sent by the device interface circuit 50 of the network management device 16 to the root network device 12 without any unicast header, since the root network device 12 can interpret the IPv6 multicast group address in the IPv6 multicast header 44 based on the mapping instructions described in Table 1; alternately, the network management device 16 can encapsulate the multicast packet 32 with a unicast header (not shown in FIG. 6) that specifies instructions for selective multicast transmission 32 and/or unicast transmission 30 by the root network device 12, without the necessity for the mapping described in Table 1.

The multicast packet 32 sent by the network management device 16 can cause the root network device 12 in operation 86 to optionally acknowledge the unicast packet (if the multicast packet 32 is encapsulated), parse the multicast group address specified in the IPv6 multicast header 44, and selectively multicast (34 of FIG. 3) the multicast packet 32 within its own root multicast area 22r on an allocated multicast transmission slot (i.e., broadcast slot), and/or unicast transmit (30 of FIGS. 3 and 6) an encapsulated packet 38 containing the multicast packet 32 to one or more destination wireless multicast hubs 20 and/or multicast relay devices 24 on an allocated unicast transmission slot.

Each wireless multicast hub 20 in operation 88 can receive a corresponding encapsulated packet 38 on an allocated unicast slot and respond by sending an acknowledgment to the transmitting network device (e.g., "A" sends an acknowledgment to "R2"; "B" sends an acknowledgment to "B1"). Each wireless multicast hub 20 receiving its corresponding encapsulated packet 38 in operation 88 can selectively multicast (34 of FIGS. 3 and 6) the received multicast packet 32 within its corresponding wireless multicast area 22 on an allocated multicast transmission slot (i.e., broadcast slot), and/or unicast transmit the multicast packet 32 to a neighboring multicast relay device 24 on an allocated unicast transmission slot, based on the multicast IPv6 address specified in the multicast packet 32. Hence, the network management device 16 can cause each of the wireless multicast hubs 20 to multicast transmit the multicast packet 32 within the respective wireless multicast areas 22a and 22b.

The network management device 16 also can cause each multicast relay device (e.g., "A1", "B5", "B7") 24 receiving the multicast packet 32 in operation 90 to selectively multicast the multicast packet 32 on an allocated multicast transmission slot and/or unicast transmit an encapsulated packet 38' to one or more neighboring devices (e.g., "A11", "B51", "B52", "B71") on an allocated unicast transmission slot, for example based on each multicast relay device 24 having received instructions to unicast transmit a received encapsulated packet 38 only if a number "N" of isolated neighbors (e.g., "A11" for "A1"; "B51" and "B52" for "B5"; "B71" for "B7") is less than the hub threshold "HT=3". Hence, each of the multicast relay devices "A1", "B5", "B7" 24 in operation 90 can unicast transmit an encapsulated packet 38' containing the multicast packet 32, ensuring reliable reception by the isolated network devices "A11", "B51", "B52", "B71" based on their ability to send an acknowledgment, decapsulate the received encapsulated packet 38', and process the decapsulated multicast packet 32.

As apparent from the foregoing, the multicast relay device 24' can execute operation 90 for unicast transmission of the multicast packet 32 to its neighboring isolated network device "A111" 28.

Hence, the example embodiments enable the network management device 16 to establish a wireless multicast tree topology 18 for scalable and reliable propagation of the multicast packet 32 throughout the wireless mesh data network 10; further, the network management device 16 can establish directed multicast based on the mapping of multicast group addresses, such that a first location-specific multicast flow destined for first network devices physically located within the wireless multicast area 22a (e.g., "turn on lights in area 'A'") can be multicast using the multicast group address "0A00::0" specified in Table 1, whereas a second location-specific multicast flow destined for second network devices physically located within the wireless multicast area 22b (e.g., "switch machines from 'standby' to 'ON' in area 'B'") can be multicast using the multicast group address "0B00::0" specified in Table 1.

Figure 5D:
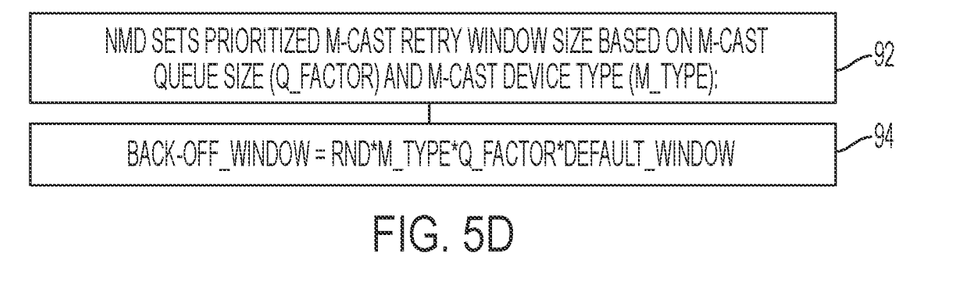

Referring to FIG. 5D, example embodiments enable the processor circuit 52 of the network management device 16 in operation 92 to set, in each wireless network device 14 in the wireless mesh network 10, a prioritized multicast retry window size "Back-off_window" based on a multicast queue size and a multicast device type (e.g., a wireless multicast hub 20, a multicast relay device 24, or a wireless multicast leaf device) allocated by the network management device for the corresponding wireless network device 14, where the lowest retry window size "Back-off_window" is the most likely to contend for access to the transmission medium for a retry attempt. As illustrated in Table 2 below, each wireless multicast wireless hub is allocated a higher priority ("Mode_factor=0.25") than a multicast relay ("Mode_factor=0.50"), and the wireless relay device is allocated a higher priority than a wireless leaf device ("Mode_factor=1.00"). Further, a higher multicast queue size (in terms of packet number "queue_size") is allocated a higher priority than a lower multicast queue size in terms of Queue factor ("Queue_factor"):

TABLE 2

MODE FACTOR AND QUEUE FACTOR

| Mode | Mode_factor | Queue Size | Queue_factor |
|---|---|---|---|
| Hub | 0.25 | queue_size < 3 | 1.00 |
| Relay | 0.50 | 3 < queue_size < 6 | 0.88 |
| Leaf | 1.00 | queue_size > 6 | 0.75 |

Hence, each wireless network device 14 in operation 94 can calculate its own prioritized multicast retry window size "Back-off_window" based on its corresponding multicast device type ("Mode") and its queue size, relative to the original (default) window size "original_window_size" and a randomly-generated number "Random( )":

Back-off_window=Random( )*Mode_factor*Queue_factor*original_window_size

Hence, the prioritized retry window size enables a prioritization of retry attempts for wireless multicast hubs, relative to queue size.

According to example embodiments, a network management device can establish a dynamically-optimized wireless multicast tree topology for a wireless mesh network, based on the physical locations of wireless mesh devices within the wireless mesh network, relative to the number of neighboring wireless mesh network devices. The example embodiments also provide a reliable distribution of a multicast traffic to different domains based on physical locations and enables prioritization of multicast traffic by wireless multicast hub devices.

Although the example embodiments have been described with respect to using RPL for generating a DAG-based network topology, other non-RPL protocols can be used for establishing a network topology (overlying a link-layer mesh).

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   establishing, by a network management device, a wireless multicast tree topology for a wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and
   causing, by the network management device, the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas,
   wherein the causing includes:
   setting, in each wireless network device in the wireless mesh network, a prioritized multicast retry window size based on a multicast queue size and a multicast device type allocated by the network management device for the corresponding wireless network device, the multicast device type including one of the wireless multicast hubs, a multicast relay, or a wireless leaf device.

2. The method of claim 1, wherein the establishing includes:
   determining the wireless neighbor count for each of a plurality of wireless network devices in the wireless mesh network; and
   classifying a first wireless network device as a wireless multicast hub based on determining the corresponding wireless neighbor count exceeding a prescribed hub threshold.

3. The method of claim 2, wherein the establishing further includes:
   classifying, as an isolated wireless device, a second wireless network device that is determined to be outside transmission range of any of the wireless multicast hubs; and
   classifying, as a multicast relay device, a third wireless network device that is determined to be within transmission range of one of the wireless multicast hubs and any isolated wireless device.

4. The method of claim 3, wherein the establishing further includes classifying, as a secondary multicast relay device, a fourth wireless network device that is determined to be within transmission range of a first of the multicast relay devices and any isolated wireless device.

5. The method of claim 3, wherein the establishing further includes classifying, as a multicast leaf device, a fourth wireless network device that is determined to be within transmission range of one of the wireless multicast hubs and outside transmission range of any isolated wireless device.

6. The method of claim 1, wherein the causing includes:
   first sending, to the root network device, an identification of the wireless multicast hubs;
   second sending, to the root network device, a mapping of a multicast group address associated with a selected group of the wireless multicast hubs; and
   transmitting, to the root network device, the multicast packet specifying the multicast group address, the multicast group address causing the root network device to unicast transmit to each of the wireless multicast hubs in the selected group the multicast packet within a corresponding unicast header specifying the corresponding wireless multicast hub.

7. The method of claim 1, wherein the multicast packet further causes the root network device to multicast the multicast packet for reception by wireless network devices within a root multicast area of the root network device.

8. The method of claim 1, wherein the unicast header causes the selected one or more of the wireless multicast hubs to transmit an acknowledgment, to the root network device, in response to receipt of the multicast packet, for reliable propagation of the multicast packet in the wireless multicast tree topology.

9. The method of claim 1, wherein the causing includes:
   first causing the root network device to unicast transmit the multicast packet encapsulated with the unicast header within an allocated unicast slot; and
   second causing the selected one or more of the wireless multicast hubs to multicast transmit the multicast packet within one or more broadcast slots.

10. The method of claim 9, wherein the causing further includes:
    third causing the selected one or more of the wireless multicast hubs to unicast transmit the multicast packet, encapsulated within a second unicast header, to a neighboring wireless network device having reachability to an isolated wireless network device.

11. The method of claim 1,
    wherein each wireless multicast wireless hub is allocated a higher priority than the multicast relay and the wireless relay is allocated a higher priority than the wireless leaf device; and wherein a higher multicast queue size is allocated a higher priority than a lower multicast queue size.

12. An apparatus implemented as a physical machine, the apparatus comprising:
  non-transitory machine readable media configured for storing executable machine readable code;
  a device interface circuit configured for transmitting a data packet in a wireless mesh network; and
  a processor circuit configured for executing the machine readable code, and when executing the machine readable code operable for:
    establishing, by the apparatus implemented as a network management device, a wireless multicast tree topology for the wireless mesh network, the wireless multicast tree topology comprising a root network device and wireless multicast hubs providing respective wireless multicast areas, the establishing including selecting each wireless multicast hub based on a corresponding location and a corresponding wireless neighbor count, and
    causing the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas,
  wherein the processor circuit is further operable for:
  setting, in each wireless network device in the wireless mesh network, a prioritized multicast retry window size based on a multicast queue size and a multicast device type allocated by the network management device for the corresponding wireless network device, the multicast device type including one of the wireless multicast hubs, a multicast relay, or a wireless leaf device.

13. The apparatus of claim 12, wherein the processor circuit is configured for:
  determining the wireless neighbor count for each of a plurality of wireless network devices in the wireless mesh network; and
  classifying a first wireless network device as a wireless multicast hub based on determining the corresponding wireless neighbor count exceeding a prescribed hub threshold.

14. The apparatus of claim 13, wherein the processor circuit is configured for:
  classifying, as an isolated wireless device, a second wireless network device that is determined to be outside transmission range of any of the wireless multicast hubs; and
  classifying, as a multicast relay device, a third wireless network device that is determined to be within transmission range of one of the wireless multicast hubs and any isolated wireless device.

15. The apparatus of claim 12, wherein the processor circuit is configured for:
  first sending, to the root network device, an identification of the wireless multicast hubs;
  second sending, to the root network device, a mapping of a multicast group address associated with a selected group of the wireless multicast hubs; and
  transmitting, to the root network device, the multicast packet specifying the multicast group address, the multicast group address causing the root network device to unicast transmit to each of the wireless multicast hubs in the selected group the multicast packet within a corresponding unicast header specifying the corresponding wireless multicast hub.

16. The apparatus of claim 12, wherein the unicast header causes the selected one or more of the wireless multicast hubs to transmit an acknowledgment, to the root network device, in response to receipt of the multicast packet, for reliable propagation of the multicast packet in the wireless multicast tree topology.

17. The apparatus of claim 12, wherein the processor circuit is configured for:
  first causing the root network device to unicast transmit the multicast packet encapsulated with the unicast header within an allocated unicast slot; and
  second causing the selected one or more of the wireless multicast hubs to multicast transmit the multicast packet within one or more broadcast slots.

18. The apparatus of claim 12,
  wherein each wireless multicast wireless hub is allocated a higher priority than the multicast relay and the wireless relay is allocated a higher priority than the wireless leaf device; and
  wherein a higher multicast queue size is allocated a higher priority than a lower multicast queue size.

19. One or more non-transitory tangible media encoded with logic for execution by a machine and when executed by the machine operable for:
  establishing, by the machine implemented as a network management device, a wireless multicast tree topology for a wireless mesh network, the wireless multicast tree topology comprising a root network device and wireless multicast hubs providing respective wireless multicast areas, the establishing including selecting each wireless multicast hub based on a corresponding location and a corresponding wireless neighbor count; and
  causing, by the network management device, the root network device to unicast transmit to a selected one or more of the wireless multicast hubs a multicast packet encapsulated within a unicast header, the unicast header causing the selected one or more of the wireless multicast hubs to multicast transmit the multicast packet within a corresponding one or more of the wireless multicast areas
  wherein the causing includes:
  setting, in each wireless network device in the wireless mesh network, a prioritized multicast retry window size based on a multicast queue size and a multicast device type allocated by the network management device for the corresponding wireless network device, the multicast device type including one of the wireless multicast hubs, a multicast relay, or a wireless leaf device.

20. The one or more non-transitory tangible media of claim 19, wherein the causing includes:
  first sending, to the root network device, an identification of the wireless multicast hubs;
  second sending, to the root network device, a mapping of a multicast group address associated with a selected group of the wireless multicast hubs; and
  unicast transmitting, to the root network device, the multicast packet specifying the multicast group address, the multicast group address causing the root network device to unicast transmit to each of the wireless multicast hubs in the selected group the multicast packet within a corresponding unicast header specifying the corresponding wireless multicast hub.

\* \* \* \* \*